United States Patent [19]

Yaguchi

[11] Patent Number: 5,213,880
[45] Date of Patent: May 25, 1993

[54] LAMINATED FILMS FOR USE IN A TOUCH PANEL

[75] Inventor: Atsunori Yaguchi, Sodegaura, Japan

[73] Assignee: Idemitsu Petrochemical Company, Limited, Tokyo, Japan

[21] Appl. No.: 530,539

[22] Filed: May 30, 1990

[30] Foreign Application Priority Data

May 31, 1989 [JP] Japan .................................. 1-138510

[51] Int. Cl.$^5$ .......................... B32B 7/02; C08G 79/02
[52] U.S. Cl. .................................... 428/217; 428/412;
428/480; 428/419; 428/516; 428/518;
428/477.7; 428/475.8; 428/702; 428/913;
428/473.5; 428/520
[58] Field of Search ............... 428/457, 458, 480, 195,
428/217, 411.1, 702, 913

[56] References Cited

U.S. PATENT DOCUMENTS 5,047,270 9/1991 Mori et al. ..................... 428/480 X
5,051,295 9/1991 Mori et al. ........................... 428/195

FOREIGN PATENT DOCUMENTS 0307861 3/1989 European Pat. Off. .
0376021 7/1990 European Pat. Off. .
59-2449 1/1884 Japan .
62-115613 5/1987 Japan .
63-241075 10/1988 Japan .

*Primary Examiner*—P. C. Sluby
*Attorney, Agent, or Firm*—Armstrong, Westerman, Hattori, McLeland & Naughton

[57] ABSTRACT

A laminated film contains a base film having a conductive layer on one side thereof and a layer obtained by curing a curable phosphazene composition coated on the other side thereof. The laminated film is suitable for use in a touch panel having a switching function when pressing an operating section of the touch panel, the operating section being made from the cured layer of the phosphazene composition. The laminated film has a remarkably balanced combination of the properties, i.e., adhesion, surface hardness and appearance on the coat surface (shrinkage upon curing).

18 Claims, No Drawings

LAMINATED FILMS FOR USE IN A TOUCH PANEL

BACKGROUND OF THE INVENTION

1. Field of the Invention

The present invention relates to a laminated film and, more particularly, to a laminated film suitable for use in a touch panel which is extensively used for electronic devices, household electrical utensils and so on.

2. Description of Related Art

Recently, due to its excellent electrical characteristics as inherent in piezoelectric inorganic material and its remarkable processability as inherent in readily processable polymer, there have increasingly been used a sort of flat keyboard switches, as called touch panel, for household electrical utensils such as television sets, audio devices and microwave ovens, electronic equipment and devices such as desk top calculators, copying machines and facsimile machines, devices and equipment for use in a variety of experiments, production and processing, and so on.

The touch panel basically comprises two sheets of transparent conductive films, each having a conductive layer made from an indium/tin oxide thin film as an electrode, which are disposed so as to allow their electrodes to face each other through a spacer. The touch panel is attached to a surface of a display member such as LCD, CRT display, plasma display, EL display or the like. As the desired electrode is pressed, electricity is passed through the two electrodes to transmit a given signal to a driving unit, thereby operating the display unit. Although a transparent and extremely flexible film such as a polyester film is used as a base film for the transparent conductive film, the film may present the problems of appearance because of the likelihood of its surface to be damaged and to appear dirty and because of quickly turning letters or characters under the film illegible. Furthermore, the film may be torn off or damaged during use for a long time period, thereby giving rise to circuit accidents or troubles of accessory devices.

In order to improve hardness of the surface of the touch panel, attempts have been made to coat the surface of the base film with a resin curable with ultraviolet rays, as disclosed in Japanese Patent Unexamined Publication No. 115,613/1987. This hard coating compound however, cannot provide a coat having a sufficient degree of adhesion when it is coated by a one-time coating.

Hard coating compound of silicone type, as recently developed, provides an excellent degree of adhesion yet requires to be coated twice or to be cured by applying heat, whereby they have the drawbacks that it takes a long period of time or it requires laborious work for processing and investment and processing costs are rendered expensive. Further, these coating compounds present the disadvantages that the thin film consisting of a thin film substrate may be curled when they are coated on the film, due to their large shrinkage upon curing and that a coating film may be cracked when they are coated in a thick layer.

On top of that, there is known a touch panel of the type to be used for desk top electronic calculators, which differs from those conventional touch panels to be attached to the surface of the display member in terms of unnecessity to use a transparent base film. The touch panel of this kind also has substantially the same problems and difficulty as the other conventional touch panels have.

SUMMARY OF THE INVENTION

Therefore, the present invention has the object to provide a laminated film which can easily be formed without double coating, which is excellent in adhesion, and which has a coat surface having a high degree of hardness.

In order to achieve the object, the present invention consists of a laminated film characterized by a base film having a conductive layer and a layer of a cured phosphazene composition formed on the surface on the side opposite to the conductive layer.

Other objects, features and advantages of the present invention will become apparent in the course of the description of the preferred embodiments which follow.

DESCRIPTION OF THE PREFERRED EMBODIMENTS

The present invention will be described more in detail as follows.

Laminated Film

The laminated film according to the present invention basically comprises a film having a conductive layer. Said laminated film is laminated with a base film with the conductive layer so as for their conductive layers to face each other through a spacer, thereby providing a touch panel which may be called a touch key, too. The touch panel demonstrates a switching action by pressing its operational surface.

The touch panel made from the laminated film according to the present invention may be used in such a form that it is attached to a display surface of the display unit as described hereinabove or as an input device of electronic calculators or computers. Hence, the touch panel may have a variety of structures as long as it can function in the manner as described hereinabove. It should be noted herein that, when the laminated film according to the present invention is used for the touch panel to be attached to a display surface of the display member, the laminated film may preferably be formed in such a manner that the base film with a conductive layer and with a layer for adjusting transmittance of visible light provided as needed is laminated with a layer of a cured phosphazene compound or composition formed as a protective layer on a surface of the base film on the side opposite to the surface thereof on which the conductive layer is disposed.

Description will be made of the preferred embodiments of the laminated film according to the present invention.

(a) Base Film

Material for the base film may include, for example, polyester such as polyethylene terephthalate, polybutylene terephthalate, total aromatic polyester, crystalline polyester, etc, polycarbonate, aromatic polyether ketone, aromatic polyether sulfone, polyarylene sulfide, nylon 6, nylon 66, polyphenylene oxide, polyarylate, polysulfone, polyarylsulfone, polyoxybenzylene, polyether ether ketone, polyether imide, polyimide, polyamidoimide, poly-4-methylpentene, polystyrene, polyethylene, polypropylene, polyvinyl chloride, polymethyl methacrylate, and so on. What material is more preferred may appropriately be determined on the basis of use of the touch panel made from the film.

The shape of the base film also may be determined by use of the touch panel.

(b) Layer for Adjusting Transmittance of Visible Light

On one of the surfaces of the base film may be formed a layer for adjusting transmittance of visible light, which is preferably provided with optical characteristics such that a uniform light absorption curve can be given over the entire range of a visible light region. The optical characteristics may be adjusted by appropriately blending a resin solution with a variety of colorants, which is coated to form the layer for adjusting transmittance of visible light.

Although the transmittance of visible light is not limited to a particular range and may appropriately be determined in accordance with use of the touch panel, the visible light transmittance may range usually from about 30% to 50%.

The resin to be used for the layer adjusting transmittance of visible light may preferably include a resin of such a type as capable of being cured with ultraviolet rays.

Although the thickness of the layer for adjusting transmittance of visible light may appropriately be determined so as to correspond to the desired transmittance of visible light, the thickness of this layer may preferably range from 3 to 10 microns in accordance with the conductive layer of the base which is to be formed on the layer for adjusting transmittance of visible light.

The layer for adjusting the transmittance of visible light may be formed by appropriate procedures such as spinner coating method, spraying coating method, roll coating method, dipping method, brushing coating method or the like.

(c) Conductive Layer or Path

The conductive layer or path is further formed on the layer for adjusting the transmittance of visible light formed on the base film in the manner as described hereinabove.

The conductive layer may be made from an indium/tin oxide layer which is commonly used as a transparent electrode.

The conductive layer may preferably be formed so as to have a resistance value ranging from 200 to 600 Ω/□ (surface resistance). If the resistance value is below the lower limit, on the one hand, the thickness of the conductive layer should be rendered thicker, leading to impairment of light transmission properties. If the resistance value is above the upper limit, on the other hand, the conductive layer or path may be rendered too thick to an extent that may impair ON/OFF reliability as an electrode when the base film having such a thick film layer is formed into the touch panel. At this end, the thickness of the conductive layer may range usually from 100 to 200 microns when the base film having the conductive layer is used for the touch panel.

(d) Layer of Cured Phosphazene Composition

The laminated film according to the present invention has a layer of a cured phosphazene composition formed on the surface of the base film on the side opposite to the surface thereof on which the conductive layer is formed or on which there is formed the layer for adjusting transmittance of visible light with the conductive layer formed thereon.

The layer of cured phosphazene composition may be formed on the base film as follows by coating and curing a curable phosphazene composition on the base film.

(1) Phosphazene Compositions (i) Curable phosphazene compounds.

The curable phosphazene compounds to be used for the present invention may include a variety of compounds and there may preferably use a compound as represented by general formula (I):

where
a and b are real numbers, in which a is greater than 0 and b is equal to or greater than 1, provided, however, that $a+b=2$;
n is equal to or greater than 3;
X is a curable group; and
Y is a non-curable group.

It is noted herein that the general formula (I) representing the curable phosphazene compound is intended in this specification to mean an average representation of a mixture of plural compounds, not a single compound. It is thus to be understood that the suffixes a and b are not necessarily restricted to integers and each of them is intended herein to mean the real number including a fraction. The suffix n is intended herein to mean the real number equal to or larger than 3, including a fraction, and preferably ranges from the real number satisfying $3 \leq n \leq 18$, preferably $3 \leq n \leq 4$. And particularly cyclic compounds suffix n of 3 to 4 are preferred.

In the above formula (I), the curable group represented by the group X is intended in generic terms to mean a functional group which can be cured by heating or by reaction upon radiation of active energy rays such as ultraviolet rays, visible light, electron rays, X-ray or the like and, more specifically, to mean a group having a reactive double bond. The group having the reactive double bond may specifically include, for example, a functional group containing an acryloyl group, a methacryloyl group, a vinyl group or an allyl group, although it may include many others.

More specifically, the functional group containing the acryloyl group or methacryloyl group may include an acryloyloxy group or a methacryloyloxy group, or may be represented by the general formula (II):

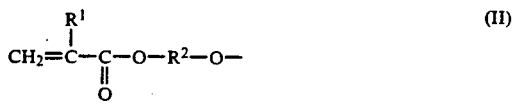

(wherein
$R^1$ is hydrogen atom or methyl group; and
$R^2$ is a linear or branched alkylene group having from 1 to 12 carbon atoms, preferably from 1 to 5 carbon atoms).

The functional group containing the acryloyl group or methacryloyl group may further include a functional group as represented by the following general formula (III):

$$\overset{R^1}{\underset{\underset{O}{\|}}{CH_2=C-C}}-\overset{H}{\underset{}{N}}-R^2-O- \quad (III)$$

(wherein $R^1$ and $R^2$ have the same meanings as above), or a residue obtainable by removing hydrogen atom from the hydroxy group of a hydroxylalkyl-substituted (meth)acrylamide,
or a functional group as represented by the following general formula (IV):

$$\overset{R^1}{\underset{\underset{O}{\|}}{CH_2=C-C}}-\overset{H}{\underset{}{N}}- \quad (IV)$$

(wherein $R^1$ and $R^2$ have the same meanings as above), or a residue obtainable by removing one hydrogen atom from the amino group of an acrylamide or methacrylamide.

The functional group containing allyl group as represented by the following formula:

$$CH_2=CH-CH_2-O-$$

and a functional group as represented by the following general formula (V):

$$\overset{R^1}{\underset{\underset{R^4}{|}}{CH_2=C-C}}\overset{R^3}{\underset{}{-}}O- \quad (V)$$

a functional group as represented by the following general formula (VI):

$$\overset{R^1}{\underset{}{CH_2=C}}-CH_2-\!\!\!\left\langle\!\!\bigcirc\!\!\right\rangle\!\!-O- \quad (VI)$$

and a functional group as represented by the following general formula (VII):

$$\overset{R^1}{\underset{}{CH_2=C}}-CH_2-O-\underset{\underset{O}{\|}}{C}-\!\!\!\left\langle\!\!\bigcirc\!\!\right\rangle\!\!-O- \quad (VII)$$

(wherein $R^1$ has the same meaning as above; $R^3$ and $R^4$ are identical to or different from each other and each are hydrogen atom or an alkyl group),
or each group being a residue obtainable by removing hydrogen atom from hydroxy group of an allyl compound having one hydroxyl group.

In the present invention curable phosphazene compounds have basically curable group herein above mentioned. In order to improve the property of the coating layer, a suitable curable group may be introduced to the curable phosphazene compound.

As the curable group represented by X, there may preferably be N-methylolacrylamido group, or a residue obtainable by removing hydrogen atom from $CH_2=CHCONHCH_2$ order to improve adhesion to the partner film.

The non-curable group represented by Y in the general formula (I) above may include a group containing, for example, hydrogen atom, a halogen atom, a phenoxy group, a halophenoxy group, an alkoxy group, a haloalkoxy group, —COOR$^5$ or —NHR$^5$ (wherein $R^5$ is an alkyl group having from 1 to 11 carbon atoms).

Among these groups, the group containing fluorine atom is preferred in terms of improvement in slip properties of a cured coating and the group containing carbonyl group is preferred in terms of improvement in adhesion of the cured coating.

Furthermore, in order to provide the cured layer of the phosphazene composition with improved water resistance, abrasion resistance, reduction in water absorption and resistance to discoloration, the non-curable group represented by Y may preferably be a fluoride group as represented by the following general formula:

$$Z(CF_2)_mCH_2O-$$

(where m is an integer from 1 to 4; and Z is hydrogen atom or fluorine atom)
or a fluoride group as represented by the following general formula:

$$(CF_3)_2CHO-$$

The fluoride group may include, for example, 2,2,2-trifluoroethoxy, 2,2,3,3,3-pentafluoro-1-propoxy, 2,2,3,3,4,4,4heptafluoro-1-butoxy, 2,2,3,3-tetrafluoro-1-propoxy, 2,2,3,3,4, 4,5,5-octafluoro-1-pentoxy and 1,1,1,3,3,3-hexafluoro-propoxy.

In order to mainly improve adhesion and flexibility, the non-curable group represented by Y may preferably include, for example, a residue from a saturated carboxylic acid as represented by the following general formula:

$$-O(CH_2)_pCOOH$$

(where q is 0, 1 to 15);
a residue from a carbocyclic carboxylic acid as represented by the following general formula:

$$-OC_6H_4(CH_2)_qCOOH$$

(where q is 0, 1 or 2);

$$-OC_6H_3(COOH)_2$$

or $$-OC_6H_3(R^6)COOH$$

(where $R^6$ is —OH or —OCH$_3$).

More specifically, the saturated carboxylic acid may include, for example, oxyacetic acid, β-hydroxypropionic acid, 4-hydroxyacetic acid, 12-hydroxydecanoic acid, 16-hydroxyhexadecanoic acid or the like. The carbocylic carboxylic acid may include, for example, p-oxybenzoic acid, p-hydroxphenylacetic acid, p-hydroxyphenylpropionic acid, 4-hydroxyphthalic acid, 2,3-dihydroxybenzoic acid, 4-hydroxy-3acid or the like.

In brief, the substituent X is a group capable of exhibiting the action for curing the phosphazene compound of the general formula (I) upon heating or upon radiation of active energy rays, while the substituent Y is a group capable of exhibiting the action which can adjust curing performance on top of adjusting physical properties of the cured resin. Hence, various properties of the cured resin consisting of the phosphazene compound can be determined by appropriately selecting the reference symbols a and b.

It is provided, however, that the phosphazene compound as represented by the general formula (I) above, in which a is 0, cannot be cured so that this compound is excluded from the category to be used for the present invention. It can be noted that the curable phosphazene compounds of the general formula (I) above, in which a is 2 and b is 0, or the phosphazene compounds having a repeating unit as represented by the following general formula:

$$-[NP(X)_2]-$$

can be used as the curable phosphazene compounds for the present invention.

(ii) Optional Components

The curable phosphazene composition to be used for the present invention may contain optional components, as needed, within the scope which does not impair the objects of the present invention.

The optional components may include, for example, curable compounds, cure accelerators, fillers, stabilizers, solvents, sensitizers, levelling agents, antistatic agents and so on.

(a) Other curable compounds:

The kind of other curable compounds is not restricted to a particular one and may preferably include, for example, a monofunctional monomer, a polyfunctional monomer or a prepolymer, which is copolymerizable with the curable phosphazene compound. More specifically, they may include, for example, compounds having a reactive double bond, such as compounds with an acryloyl group, a methacryloyl group, a vinyl group or an allyl group. For example, a polyfunctional acrylic monomer, such as dipentaerythritol hexaacrylate, is preferred.

These curable compounds may be used singly or in combination of two or more and in an amount ranging usually from 10 to 300 parts by weight with respect to 100 parts by weight of the curable phosphazene compound to be used.

(b) Cure accelerators:

When ultraviolet or visible rays are used for curing, it is preferred to use, as a cure accelerator, a photopolymerization initiator such as 1-hydroxycyclohexylphenyl ketone, dibenzoyl, benzoylmethyl ether, benzoylethyl ether, p-chlorobenzophenone, p-methoxybenzophenone, benzoyl peroxide, di-tert.-butyl peroxide and camphor quinone. The photopolymerization initiator may be used singly or in combination of two or more and in an amount ranging usually from 0.05 to 10.0 parts by weight with respect to 100 parts by weight of the curable phosphazene compound.

When the curing is performed at ambient or elevated temperatures, it is preferred to use a polymerization initiator including a peroxide or an amine, singly or in combination. The peroxide may include, for example, benzoyl peroxide, p-chlorobenzoyl peroxide, 2,4-dichlorobenzoyl peroxide, tert-butylhydroperoxide, di-tert-butyl peroxide, dicumyl peroxide, tert-butyl peroxyacetate, diacetate or tert-butyl peroxybenzoate. The amine type compound may include, for example, N,N-diethanol-p-toluidine, dimethyl-p-toluidine, p-toluidine, methylamine, tert-butylamine, methylethylamine, diphenylamine, 4,4'-dinitrodiphenylamine, o-nitroaniline, p-bromoaniline or 2,4,6-tribromoaniline.

The total amount of the peroxide and the amine may range usually from 0.05 to 5.0 parts by weight with respect to 100 parts by weight of the curable phosphazene compound.

(c) Fillers:

The filler may be inorganic or organic fillers in forms of powders and fibers and may include, for example, silica, glass, metal, ceramics and organic fibers. Additives such as an antioxidant and an ultraviolet absorber may be used.

The kind of the filler to be used may be determined in accordance with a use of the laminated film according to the present invention.

In order to ensure optical performance, particularly transparency, of a product from the composition to be used in accordance with the present invention, the inorganic or organic filler may preferably be a filler which does not block active light rays from penetrating, such a filler including, for example, an inorganic filler such as colloidal silica, or an organic filler such as polymethyl methacrylate.

(d) Stabilizers:

The stabilizer may include, for example, a polymerization inhibitor such as a hydroquinone, a photostabilizer and an antioxidant.

(e) Solvents:

As the solvent, there may be exemplified an organic solvent including, for example, a ketone, e.g., methyl ethyl ketone, methyl isobutyl ketone or cyclohexanone, an aromatic hydrocarbon, e.g., benzene, toluene or xylene, a halogenated hydrocarbon, e.g., chloroform or methylene chloride, an alcohol, e.g., methanol, propanol or butanol, or an ether, e.g., tetrahydrofuran or dioxane, or a cellosolve such as ethyl cellosolve or butyl cellosolve. The solvent may be used singly or in combination. Among those solvents as described hereinabove, the ketone or alcohol or a mixture thereof is preferred, and methyl isobutyl ketone or isopropyl alcohol or a mixture with butyl alcohol may conveniently be used.

The ratio of the solvent to the phosphazene compound is not restricted to a particular one and may range usually from 1 to 9 to 9 to 1, by weight. Particularly, the composition containing the organic solvent in the rate to the phosphazene compound ranging from 9 to 1 to 5 to 5 is preferred in terms of workability because of a remarkable range of its viscosity.

(2) Processes of Forming Cured Layer of Phosphazene Composition

In order to improve or enhance adhesion of the cured layer or coating of the curable phosphazene composition, it is preferred to subject the base film to surface treatment in advance prior to coating the composition on the base film.

The surface treatment to be used for the present invention may be corona discharge treatment, flame treatment, acid washing treatment using nitric acid or the like, or primer treatment for coating a vinyl copolymer with a carboxyl group, an epoxy resin or a phenolic resin.

(e) Processes and method of coating:

The curable phosphazene composition according to the present invention may be coated on the partner film as intact or as a dilution or a mixture with a solvent in conventional manner such as spinner coating method, spraying coating method, roll coating method, dipping method, brushing coating method or the like. When the solvent is used, it is removed after coating.

(b) Curing method:

The curable phosphazene composition coated is then cured at ambient or elevated temperatures or by radiation of ultraviolet rays, electron rays, X-rays, gamma rays or the like, thereby forming a cured coating or layer. The curing by radiation of ultraviolet rays is preferred. In this case, it is desired that ultraviolet rays having wavelengths ranging from 200 to 550 nm be irradiated for a time period over 0.1 second, preferably ranging from 1 to 300 seconds. An integrated quantity of light irradiated may usually range from 50 to 5,000 mj/cm$^2$.

When the curing is carried out at elevated temperatures, it is desired that the curing is implemented to an entire extent at the temperature above 100° C.

(c) Cured coating or layer:

The film thickness of the cured coating or layer may range usually from 0.1 to 50 microns, preferably from 0.2 to 30 microns. If the film thickness is thinner than 0.1 micron, the resulting cured coating film cannot sufficiently exhibit mechanical effects and, as a result, it cannot play a sufficient role as a protective layer, while the coating film having the film thickness over 50 microns may be likely to come off from the base film or to be cracked or may reduce flexibility and workability as a touch panel.

The present invention will be described in more detail by way of examples, with reference to comparative examples.

PREPARATION EXAMPLE 1

Preparation of curable phosphazene compound A

A 1-liter flask equipped with a thermometer, a stirrer, a dropping funnel and a condenser was charged with 58.0 grams of hexachlorocyclotriphosphazene, 50 ml of toluene and 168 grams of pyridine, and the mixture was stirred.

To this mixture was dropwise added 156 grams of 2-hydroxyethyl methacrylate from the dropping funnel. The resulting mixture was heated to 60° C. on a warm bath and the reaction was carried out over the period of 8 hours with stirring. Precipitated crystals were filtered off and the solvent in the filtrate was then removed by distillation under reduced pressures, leaving 136 grams (yield: 91%) of a curable phosphazene compound (A) in a form of pale yellow, viscous liquid.

PREPARATION EXAMPLE 2

Preparation of curable phosphazene compound B

A 1-liter flask equipped with a thermometer, a stirrer, a dropping funnel and a condenser was charged with 100 ml of tetrahydrofuran and 11.6 grams of metallic sodium. To this mixture was dropwise added 55.5 grams of 2,2,2-trifluoroethanol and the reaction was carried out under reflux until the sodium disappeared.

To the resulting reaction mixture was dropwise added a solution of 58.0 grams of hexachlorocyclotriphosphazene in 100 ml of toluene, and the mixture was reacted under reflux for 2 hours. After the reaction mixture was cooled to room temperature, 191 grams of 2-hydroxyethyl methacrylate was dropwise added to the above reaction mixture from the dropping funnel. The resulting mixture was then heated to 60° C. on a warm bath and the reaction was carried out over the period of 8 hours with stirring. Precipitated crystals were filtered off and the solvent in the filtrate was then removed by distillation under reduced pressure, leaving 88 grams (yield: 93%) of a curable phosphazene compound (B).

FORMULATION EXAMPLES

Using the curable phosphazene compounds A and B prepared in Preparation Examples 1 and 2, respectively, coating compounds A and B having the following compositions are prepared, which can be cured upon exposure to ultraviolet rays.

| Formulation Example 1: Coating Material A | |
|---|---|
| Curable phosphazene compound A | 25 grams |
| Methyl ethyl ketone | 10 grams |
| Ethyl cellosolve | 5 grams |
| Xylene | 10 grams |
| Isopropanol | 20 grams |
| 2-Methyl-[4-(methylthio)phenyl]-2-morpholino-1-propane | 1.4 grams |
| Ethyl p-Dimethylaminobenzoate | 0.4 grams |
| Formulation Example 2: Coating Material B | |
| Curable phosphazene compound B | 20 grams |
| Dipentaerythritol hexaacrylate | 20 grams |
| Methyl ethyl ketone | 15 grams |
| Acetoxyethane | 5 grams |
| Butylcellosolve | 3 grams |
| Butanol | 15 grams |
| Isopropanol | 5 grams |

FORMULATION EXAMPLE 3

Coating Compound C

As a comparative example, coating compound C was prepared by adding ethyl acetate and isobutanol to commercially available curable acrylic type resin.

EXAMPLE 1

To a commercially available ultraviolet-curable resin were added a cross-linking monomer, solvent, surfactant and colorant, and the mixture was stirred thereby leading to formation of a resin to be used for forming a layer for adjusting transmittance of visible light. This resin was coated in a film thickness of 5 microns on one side of a polyester base film which had previously been surface-treated by means of corona discharge. On the resin coat was formed an indium/tin oxide layer as a conductive layer by means of sputtering.

On the other side of the base film with the conductive layer formed on the one side thereof was then coated the coating compound A by spray coating method, and the coating was exposed to ultraviolet rays in the amount of 70 mj per square centimeter, thereby forming the cured layer having film thicknesses of 2.5 microns and 6.3 microns, respectively.

The evaluation results are shown in the Table below.

EXAMPLE 2

The procedures of Example 1 were followed except for using the coating compound B in place of the coating compound A, thereby forming the cured layer having film thicknesses of 2.8 microns and 5.8 microns, respectively.

The evaluation results are shown in the Table below.

COMPARATIVE EXAMPLE 1

The coating compound C was sprayed on the same base film used in Example 1 and the cured film having film thicknesses of 2.5 and 6.5 microns were obtained by irradiating ultraviolet rays in the amount of 250 mj per square centimeter.

The evaluation results are shown in the Table below.

COMPARATIVE EXAMPLE 2

The procedures of Example 1 were followed except for using a coating compound prepared from dipentaerythritol hexaacrylate in place of the curable phosphazene compound A used in the coating compound A, thereby yielding a cured layer having a film thickness of 2.5 microns.

As a result, it was found that the resulting base film was so curled due to shrinkage upon curing that adhesion of the cured layer was too poor to be practically applied as compared with those obtained in the Examples above.

Non-coated touch panel:

A non-coated touch panel was prepared in the same manner as in Example 1 except for using no coating compound A.

Evaluation on the following items is made as follows:

1. Adhesion:

Crosscut tape test: The cured coating film was crosscut with the space of 1 mm to form 100 squares and an adhesive tape was stuck on their surfaces. The adhesion was then rated by the number of the squares peeled off from the polyester film as the adhesive tape was stripped off. For instance, when 50 out of 100 squares were torn off, the adhesion is represented as 50/100.

2. Surface hardness:

Taber abrasion test: The degree of haze (Δ haze) was evaluated after rotation at 100 rpm under the load of 500 grams.

3. Appearance of coat (visual examination):

The evaluation on appearance of a coat was made by visually observing the extent to which the base film is curled after curing and the state in which the cured coating adheres to the base film.

TABLE

| | Film Thickness, microns | Appearance | Adhesion | Surface Hardness, Δ haze |
|---|---|---|---|---|
| Example 1 | 2.5 | Good | 100/100 | 6.8 |
| | 6.3 | Good | 100/100 | 4.3 |
| Example 2 | 2.7 | Good | 100/100 | 5.2 |
| | 5.8 | Good | 100/100 | 4.1 |
| Comparative | 2.5 | Partially flaked | 30/100 | —*) |
| Example 1 | 6.5 | Partially flaked | 0/100 | —*) |
| Uncoated Touch Panel | — | — | | 38.0 |

Notes: Substrate: Polyester film (188 microns)
*)No surface hardness measured due to poor appearance 4. Conclusion As is apparent from the test results as shown in the Table above, the coating materials prepared in Examples 1 and 2 produced the cured layers on the laminated film according to the present invention, which is provided with a remarkable balance in all the properties, i.e., adhesion, surface hardness and appearance on the coat. On the contrary, the cured coats produced from the coating materials obtained in the Comparative Examples produced considerably insufficient test results in all the test items.

As have been described hereinabove, as the curable phosphazene composition was coated and cured, the laminated films according to the present invention provide the cured coats which are excellent in all properties, such as adhesion to the base film, surface hardness and appearance on the coat surface (cure shrinkage).

What is claimed is:

1. A transparent base laminated film comprising a base film having a transparent conductive layer of indium/tin oxide on one side thereof and a layer of a curable phosphazene composition coated on the other side thereof.

2. A laminated film as claimed in claim 1, wherein a layer for adjusting transmittance of visible light is interposed between the conductive layer and the base film.

3. A laminated film as claimed in claim 1, wherein the phosphazene composition comprises a phosphazene compound as represented by general formula (I):

where
a and b are real numbers, in which a is greater than 0 and b is equal to or greater than 1, provided, however, that $a+b=2$;
n is equal to or greater than 3
X is a curable group; and
Y is a non-curable group.

4. A laminated film as claimed in claim 3, wherein the suffix n in the general formula (I) is 3 to 18.

5. A laminated film as claimed in claim 3, wherein the curable group as represented by X is a group as represented by general formula (II):

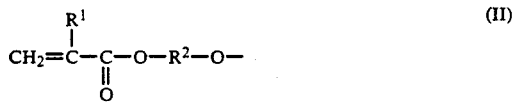

wherein
$R^1$ is hydrogen atom or methyl group; and
$R^2$ is a linear or branched alkylene group having from 1 to 12 carbon atoms,
or a group as represented by general formula (III):

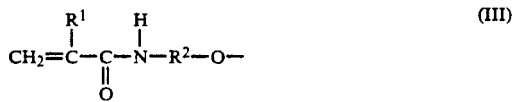

wherein $R^1$ and $R^2$ have the same meanings as above, or a residue obtainable by removing hydrogen atom from the hydroxy group of a hydroxylalkyl-substituted (meth)acrylamide, or a functional group as represented by the following general formula (IV):

wherein $R^1$ and $R^2$ have the same meanings as above, or a residue obtainable by removing one hydrogen atom from the amino group of an acrylamide or methacrylamide.

6. A laminated film as claimed in claim 3, wherein the curable group as represented by X is a group as represented by the following formular:

or a functional group as represented by the following general formula (V):

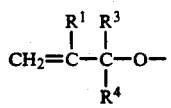 (V)

or a functional group as represented by the following general formula (VI):

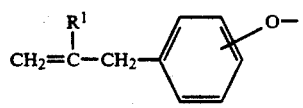 (VI)

or a functional group as represented by the following general formula (VII):

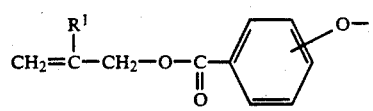 (VII)

wherein $R^1$ has the same meaning as above;

$R^3$ and $R^4$ are identical to or different from each other and each are hydrogen atom or an alkyl group, or each group being a residue obtainable by removing hydrogen atom from hydroxy group of an allyl compound having one hydroxyl group.

7. A laminated film as claimed in claim 3, wherein the curable group represented by X is N-methylolacrylamido group.

8. A laminated film as claimed in claim 3, wherein the non-curable group represented by Y is a group containing hydrogen atom, a halogen atom, a phenoxy group, a halophenoxy group, an alkoxy group, a haloalkoxy group, $-COOR^5$ or $-NHR^5$ where $R^5$ is an alkyl group having from 1 to 11 carbon atoms.

9. A laminated film as claimed in claim 8, wherein the group containing the halogen atom is a fluoride group as represented by the following general formula:

$Z(CF_2)_mCH_2O-$ where m is an integer from 1 to 4; and

Z is hydrogen atom or fluorine atom.

or a fluoride group as represented by the following general formula:

$(CF_3)_2CHO-$

10. A laminated film as claimed in claim 9, wherein the fluoride group is 2,2,2-trifluoroethoxy group, 2,2,3,3,3-penta-fluoro-1-propoxy group, 2,2,3,3,4,4,4-heptafluoro-1-butoxy group, 2,2,3,3-tetrafluoro-1-propoxy group, 2,2,3,3,4,4,5,5-octafluoro-1-pentoxy group or 1,1,1,3,3,3-hexafluoro-2-propoxy group.

11. A laminated film as claimed in claim 9, wherein the non-curable group represented by Y is a residue from a saturated carboxylic acid as represented by the following general formula:

$-O(CH_2)_pCOOH$ where p is 1 to 15;

or a residue from a carbocyclic carboxylic acid as represented by the following general formula:

$-OC_6H_4(CH_2)_qCOOH$ where q is 0, 1 or 2;

$-OC_6H_3(COOH)_2$ or $-OC_6H_3(R^6)COOH$ where $R^6$ is $-OH$ or $-OCH_3$.

12. A laminated film as claimed in claim 11, wherein the saturated carboxylic acid is oxyacetic acid, β-hydroxypropionic acid, 4-hydroxyacetic acid, 12-hydroxydecanoic acid or 16-hydroxyhexadecanoic acid and the carbocylic carboxylic acid acid is p-oxybenzoic acid, p-hydroxyphenylacetic acid, p-hydroxyphenylpropionic acid, 4-hydroxyphthalic acid, 2,3-dihydroxybenzoic acid or 4-hydroxy-3-methoxybenzoic acid.

13. A laminated film as claimed in claim 5, wherein $R^2$ is a linear or branched alkylene group having from 1 to 5 carbon atoms.

14. A laminated film for use in a touch panel having a switching function by pressing an operating surface of the touch panel, comprising a transparent base film having a transparent conductive layer of indium/tin oxide on one side thereof and a layer of a cured phosphazene composition coated on the other side thereof.

15. A laminated film as claimed in claim 14, wherein the layer of the cured phosphazene composition functions as a protective layer.

16. A laminated film as claimed in claim 14, wherein a layer for adjusting transmittance of visible light is interposed between the conductive layer and the layer of the cured phosphazene composition.

17. A laminated film for use in a touch panel having a switching function by pressing an operating surface of the touch panel, comprising a transparent base film having a transparent conductive layer of indium/tin oxide on one side thereof and a protective layer formed on the other side thereof, said protective layer serving as an operating surface, the protective layer being a cured phosphazene composition coated on the other side of the base film.

18. A laminated film as claimed in claim 1, wherein the conductive layer has a resistance value ranging from 200 to 600 ohms/square.

* * * * *